US008036186B2

(12) United States Patent
Gupta et al.

(10) Patent No.: US 8,036,186 B2
(45) Date of Patent: Oct. 11, 2011

(54) ADAPTIVELY SETTING TRANSMISSION POWER LEVELS OF NODES WITHIN A WIRELESS MESH NETWORK

(75) Inventors: Mukesh Gupta, Milpitas, CA (US); Devabhaktuni Srikrishna, Sunnyvale, CA (US); Wenge Ren, Sunnyvale, CA (US); Cyrus Behroozi, Menlo Park, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 829 days.

(21) Appl. No.: 11/493,737

(22) Filed: Jul. 26, 2006

(65) Prior Publication Data

US 2008/0025269 A1      Jan. 31, 2008

(51) Int. Cl.
| | |
|---|---|
| H04W 4/00 | (2009.01) |
| H04B 7/185 | (2006.01) |
| H04L 12/56 | (2006.01) |
| H04L 12/28 | (2006.01) |
| H04L 12/26 | (2006.01) |
| H04B 7/00 | (2006.01) |

(52) U.S. Cl. ........ 370/338; 370/318; 370/392; 370/400; 370/252; 370/332; 455/522

(58) Field of Classification Search .......... 370/338, 370/401
See application file for complete search history.

(56) References Cited

U.S. PATENT DOCUMENTS

| | | | |
|---|---|---|---|
| 5,257,283 A | 10/1993 | Gilhousen et al. | |
| 5,544,196 A | 8/1996 | Tiedemann, Jr. et al. | |
| 5,568,483 A | 10/1996 | Padovani et al. | |
| 5,590,408 A | 12/1996 | Weiland et al. | |
| 5,638,412 A | 6/1997 | Blakeney, II et al. | |
| 5,655,220 A | 8/1997 | Weiland et al. | |
| 5,778,338 A | 7/1998 | Jacobs et al. | |
| 6,480,497 B1 | 11/2002 | Flammer, III et al. | |
| 6,678,530 B1 * | 1/2004 | Hunzinger | 455/522 |
| 2002/0067701 A1 * | 6/2002 | Chen et al. | 370/318 |
| 2002/0141349 A1 * | 10/2002 | Kim et al. | 370/252 |
| 2003/0232621 A1 * | 12/2003 | Brooks | 455/424 |
| 2004/0022223 A1 * | 2/2004 | Billhartz | 370/338 |
| 2004/0203782 A1 * | 10/2004 | Peng et al. | 455/436 |
| 2004/0246935 A1 * | 12/2004 | Joshi et al. | 370/338 |

(Continued)

*Primary Examiner* — Dwayne Bost
*Assistant Examiner* — Timothy Pham
(74) *Attorney, Agent, or Firm* — Brian R. Short

(57) ABSTRACT

A method of adaptively setting a transmission power level of a node within a wireless mesh network is disclosed. The method includes monitoring a quality of a plurality of reverse direction links between the node and downstream nodes, and between the node and an upstream node, of the wireless mesh network. At least one worst quality reverse direction link is identified. If the at least one worst quality link is greater than a high threshold, then the transmission power level of the node is decreased. If the at least one worst quality link is less than a low threshold, then the transmission power level of the node is increased. A method of adaptively selecting transmission power of gateway nodes of a wireless mesh network is also disclosed. The method includes each gateway node monitoring a quality of a plurality of reverse direction links between the gateway node and downstream nodes of the wireless mesh network. Each gateway node identifies at least one worst quality reverse direction link. For each gateway node, if the at least one worst quality link is greater than a high threshold, then decreasing the transmission power level of the gateway node is decreased. For each gateway node, if the at least one worst quality link is less than a low threshold, then the transmission power level of the gateway node is increased.

12 Claims, 5 Drawing Sheets

U.S. PATENT DOCUMENTS

| | | |
|---|---|---|
| 2005/0020213 A1 | 1/2005 | Azman et al. |
| 2005/0101340 A1 | 5/2005 | Archiable |
| 2005/0117559 A1* | 6/2005 | Malladi et al. ............... 370/342 |
| 2005/0136844 A1 | 6/2005 | Giesberts et al. |
| 2006/0002350 A1* | 1/2006 | Behroozi ...................... 370/338 |
| 2006/0045018 A1* | 3/2006 | Masri ............................ 370/241 |
| 2006/0133404 A1* | 6/2006 | Zuniga et al. ................. 370/437 |
| 2006/0268792 A1* | 11/2006 | Belcea ......................... 370/338 |

* cited by examiner

ADAPTIVELY SETTING TRANSMISSION POWER LEVELS OF NODES WITHIN A WIRELESS MESH NETWORK

FIELD OF THE INVENTION

The invention relates generally to wireless communications. More particularly, the invention relates to a method and apparatus of adaptively setting transmission power levels of nodes within a wireless mesh network.

BACKGROUND OF THE INVENTION

Wireless mesh networks are gaining popularity because wireless infrastructures are typically easier and less expensive to deploy than wired networks. However, wireless infrastructures can be susceptible to environmental conditions and self-interference.

FIG. 1 shows a prior art mesh network that includes a gateway 110 connecting a client devices 140, 142 to a wired network 100 through access nodes 120, 122, 130, 132. The connections between the gateway 110 and the access nodes 120, 122, 130, 132 can be wireless. Additionally, the connection between the access nodes 120, 122, 130, 132 and the clients 140, 142 can be wireless. Wireless connections typically are subject to conditions that can make the connections unreliable. Such conditions include fading, multi-path and signal interference.

The access nodes and gateways are all communicating with each other over wireless links. Therefore, the access nodes and gateways typically suffer from self-interference. That is, the access nodes and gateways tend to be somewhat proximate to each other, and typically, can receive at least some transmission signal energy (unintended) from each other. The unintended signal energy interferes with the intended transmission signals, resulting in self-interference.

It is desirable to have a wireless network in which transmission signal power is great enough to ensure proper link quality, but controlled to limit interference with unintended receiving devices.

SUMMARY OF THE INVENTION

One embodiment of the invention includes a method of adaptively setting a transmission power level of a node within a wireless mesh network. The method includes monitoring a quality of a plurality of reverse direction links between the node and downstream nodes, and between the node and an upstream node, of the wireless mesh network. At least one worst quality reverse direction link is identified. If the at least one worst quality link is greater than a high threshold, then the transmission power level of the node is decreased. If the at least one worst quality link is less than a low threshold, then the transmission power level of the node is increased.

Another embodiment of the invention includes a method of adaptively selecting transmission power of gateway nodes of a wireless mesh network. The method includes each gateway node monitoring a quality of a plurality of reverse direction links between the gateway node and downstream nodes of the wireless mesh network. Each gateway node identifies at least one worst quality reverse direction link. For each gateway node, if the at least one worst quality link is greater than a high threshold, then the transmission power level of the gateway node is decreased. For each gateway node, if the at least one worst quality link is less than a low threshold, then the transmission power level of the gateway node is increased.

Other aspects and advantages of the present invention will become apparent from the following detailed description, taken in conjunction with the accompanying drawings, illustrating by way of example the principles of the invention.

DETAILED DESCRIPTION

Figure 1:
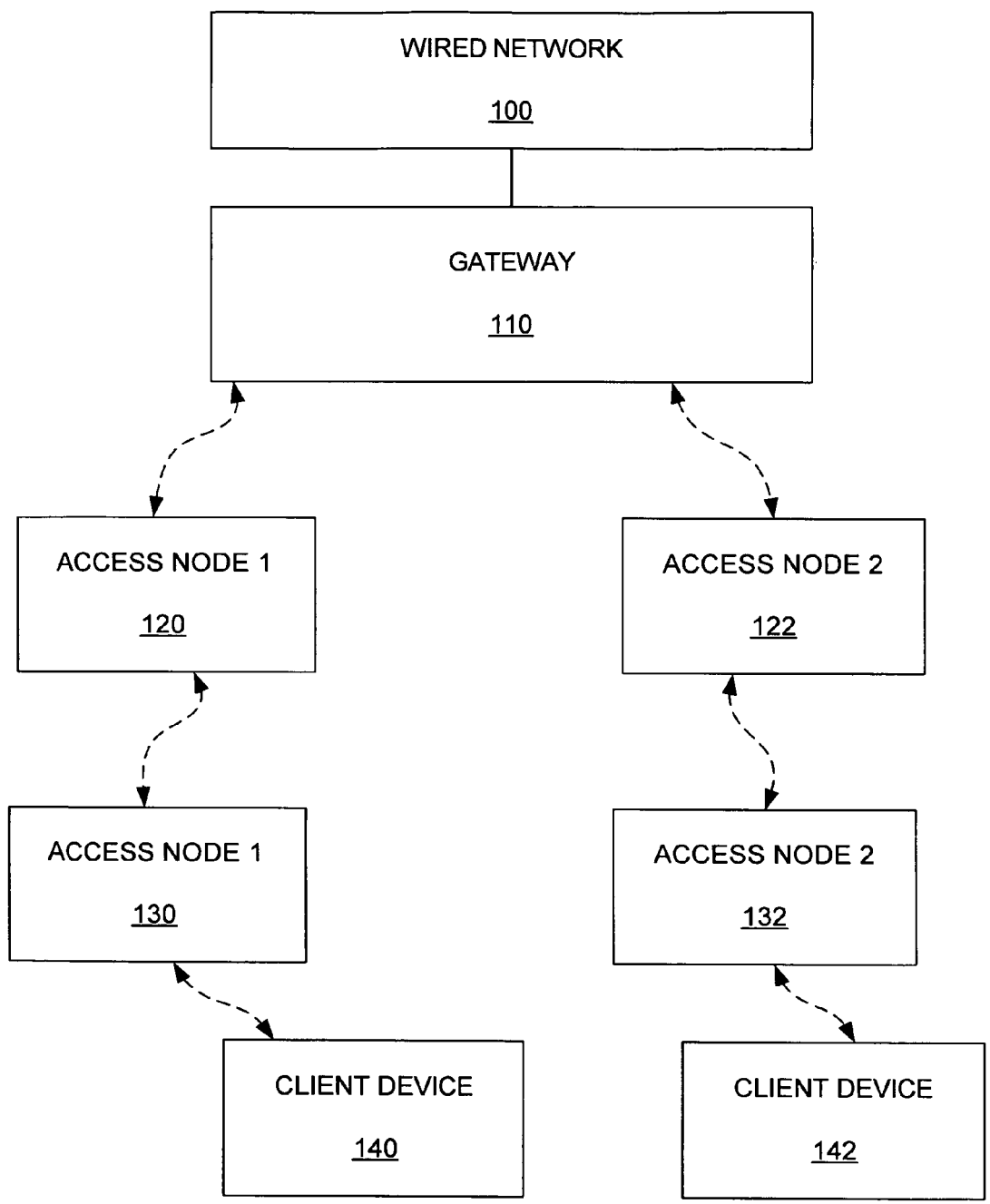
FIG. 1 shows a prior art mesh network.

As shown in the drawings for purposes of illustration, the invention is embodied in an apparatus and method for adaptively setting transmission power levels of nodes within a mesh network.

As previously described, wireless mesh network include many wireless access node that can wirelessly communicate with each other. As a result, nodes within the network can suffer from self-interference. That is, transmission between one set of nodes can interfere with transmission between another set of nodes. Therefore, it is desirable to minimize transmission power levels of nodes within the wireless mesh network. However, reducing the transmission power levels can reduce the quality of the wireless links between the nodes of the wireless mesh network. That is, signal to noise ratios (SNRs) of transmitted signals typically decrease when decreasing the transmitted signal levels, which causes the data rates of the wireless links to be decreased. There is a tradeoff in setting the transmission power levels between mesh network self-interference and mesh network data rates or throughput.

Figure 2:
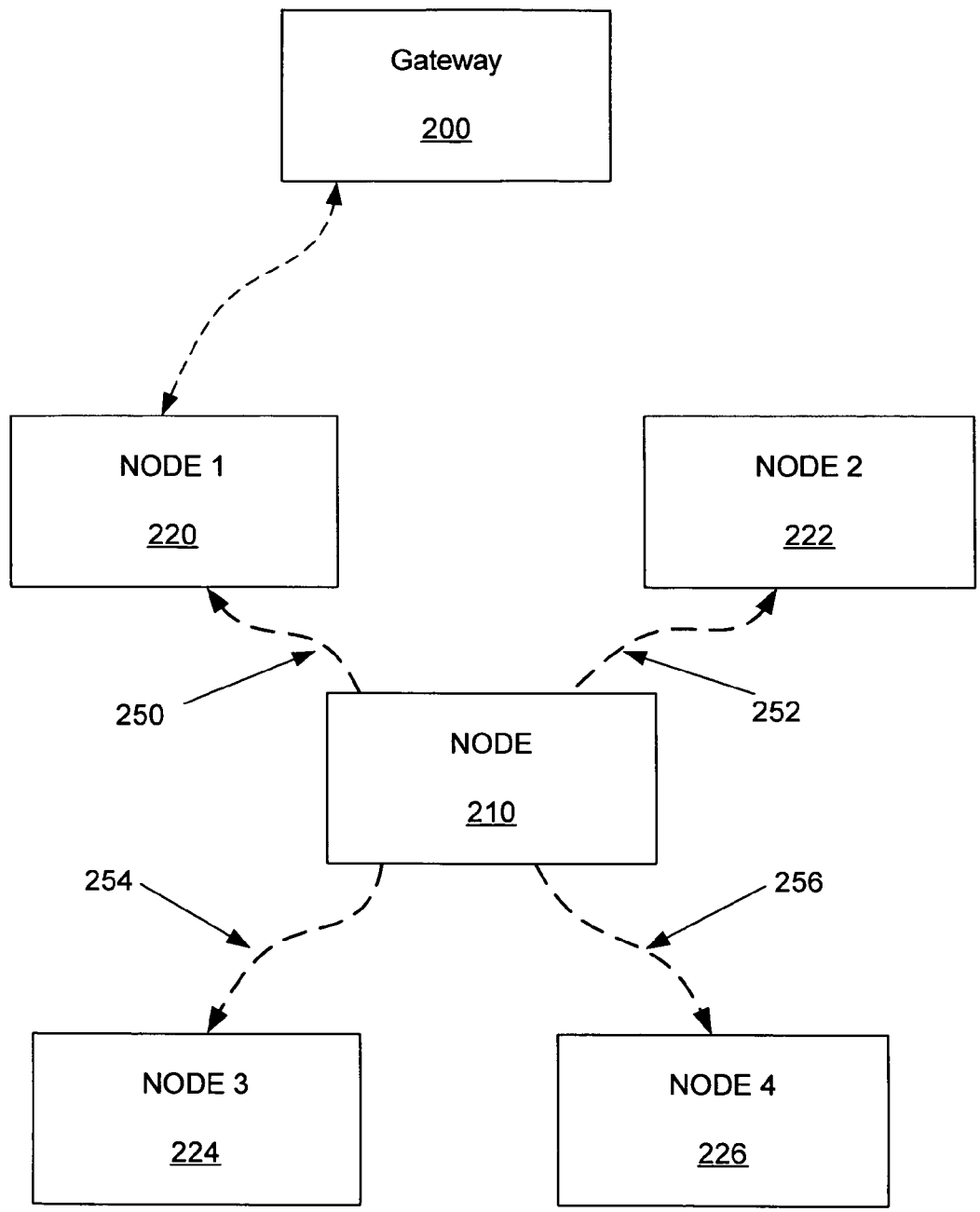
FIG. 2 shows a node and associated reverse direction links within a wireless mesh network

FIG. 2 shows a node and associated reverse direction links within a wireless mesh network, that can benefit from methods of setting transmission power levels of the node. The wireless mesh network includes a gateway 200 that can be wired or wirelessly connected to a wired network, which can be connected to the interne. The gateway 200 and a plurality of access nodes 220, 222, 210, 224, 226 provide points in which a client device (not shown) can access the network. That is, the client device can access the network through the gateway 200, or through any of the access nodes 220, 222, 210, 224, 226.

The network shown in FIG. 2 is typically part of a larger wireless mesh network that can include any number of gateways, and any number of access nodes. As such, interference between access nodes of the mesh network can hinder performance of the mesh network.

Routing paths through the mesh network (as will be described later) are based to some degree on the quality of the links between the gateway 200 and the access nodes 220, 222, 210, 224, 226. The order of each access node is defined by how many wireless hops the access node is located from the gateway 200. For example, the access node 210 is a second-order access node because it is two wireless hops away from the gateway 200. The access node 220 is a first-order access node because it is only one wireless hop away from the gateway 200. The access nodes 222, 224, 226 are third-order access node because they are located three wireless hops away from the gateway 200.

The wireless links can be defined as upstream or downstream links depending upon whether the link is directed from a node towards the gateway 220 or away from the gateway 200. That is, for example, the link 250 is an upstream link of the node 210 because the link 250 is directed towards the gateway 200; whereas the links 252, 254, 256 are downstream links because they are directed away from the gateway 200. The link 250, however, is a downstream link of the access node 220.

Each of the links includes two transmission directions, that define the direction of packets traveling through a link relative to a gateway or access node. The arrows of the links 220, 222, 224, 226 depict a reverse direction link relative to the access node 210. The reverse direction links can generally be defined as directed away from the node (access node or gateway) in question. The quality of the reverse direction links can be determined in a similar fashion as link qualities are determined during routing. More specifically, routing packets (also referred to as routing beacons) are transmitted from each node (access node and gateway). A persistence of the routing packets that are successfully received by a neighboring node determines the quality of the link between the transmitting node and the neighboring node. The receiving neighboring nodes can include information regarding the direction link quality (that is, the persistence of successfully received routing packets) in their own routing packets, which are receive by the original transmitting node. Therefore, the transmitting node can determined the reverse direction link qualities between it and all of its neighboring access nodes.

Knowledge of the quality of the reverse direction links of a node (access node or gateway) can be used by the node to set it transmission power level. A relatively good quality link can have the transmit power level of the signal traveling through the link decreased, and a relatively bad quality link can have the transmit power level of the signal traveling through the link increased. Additionally, the transmission data rate of the signal traveling through a good quality link can be increased, and the transmission data ate of the signal traveling through a bad quality link can be decreased.

Figure 3:
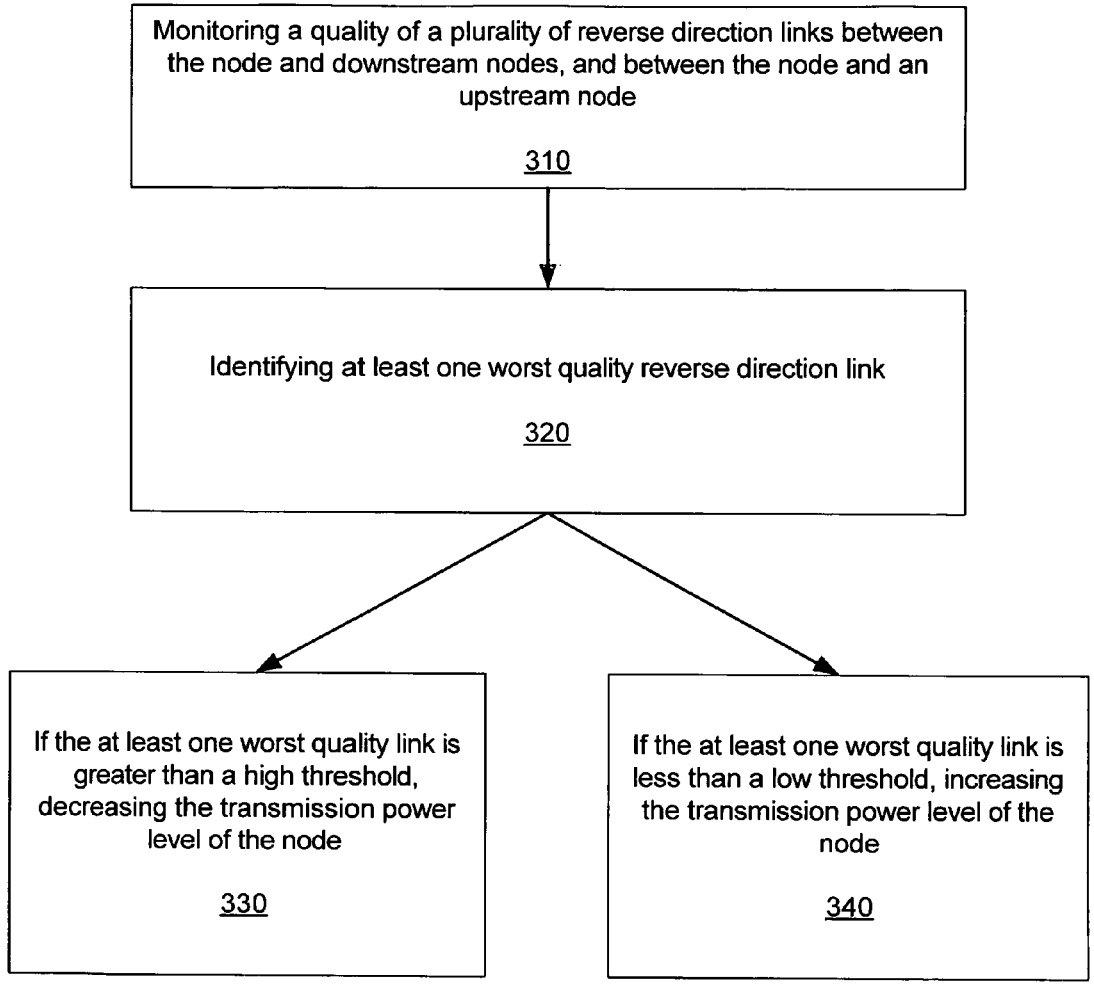
FIG. 3 is a flow chart that includes steps of one example of a method of setting a transmission power of a node within a wireless mesh network.

FIG. 3 is a flow chart that includes steps of one example of a method of setting a transmission power of a node within a wireless mesh network. A first step 310 includes monitoring a quality of a plurality of reverse direction links between the node and downstream nodes, and between the node and an upstream node. A second step 320 includes identifying at least one worst quality reverse direction link. If the at least one worst quality link is greater than a high threshold, then a third step 330 includes decreasing the transmission power level of the node. If the at least one worst quality link is less than a low threshold, then a fourth step 340 includes increasing the transmission power level of the node.

If the link qualities are good, generally the transmission data rate can be increased. If the link qualities are poor, generally the transmission data rate should be decreased. For one embodiment, if the at least one worst quality link is greater than the high threshold, then the transmission data rate of the node is increased. If the at least one worst quality link is less than the low threshold, then the transmission data rate of the node is decreased.

Several different criteria can be used for initiating monitoring of the quality of the reverse direction links. For example, the monitoring can be initiated on a periodic basis. That is, the monitoring can be a scheduled event that is performed independently of how the mesh network is performing. Alternatively, the monitoring can be initiated due to a performance related criteria. Such criteria include a neighboring node communicating a level of interference above an interference threshold, or a downstream node indicating a lack of received signal strength.

As with the routing, one embodiment includes the quality of the reverse direction links being determined by a persistence of routing packets transmitted by the node that are successfully received by each of the neighboring nodes. That is, the node broadcast routing packets (as will be described later). Each neighboring nodes can determine the quality of the reverse direction link between the neighboring node and the node by measuring the persistence of the routing packets received by the neighboring node. Other link quality parameters can alternatively be used, such as, signal to noise ratio (SNR) or packet error rate (PER).

Once a neighboring node determines the quality of the reverse direction link, the neighboring node includes this information is its own routing packets. Therefore, the original transmitting node can receive the neighboring routing packet and extract the reverse link quality information. As described, persistence of routing packets is a reverse direction link quality that can be communicated to a transmitting node.

Embodiments include halting or pausing the adaptive transmission power selection process. For example, the node may be performing a frequency channel selection process. The frequency channel selection process is also and adaptive process in which the node cycles through possible transmission frequencies to determine an optimal transmission frequency. Typically, the node cycles through the available transmission frequencies and evaluates link qualities and noise. Based on the evaluations, the node selects a transmission channel. An embodiment includes setting the transmission power level of the node to a maximum level and the transmission data rate to a minimum level when the node is performing frequency channel scanning.

Another embodiment includes pausing or halting the adaptive transmission power selection process when a neighboring node is performing and adaptive transmission channel selection. This embodiment includes setting the transmission power level to a maximum level and the transmission data rate to a minimum level when the node receives notice from a neighboring node, that the neighboring node is performing frequency channel scanning.

Figure 4:
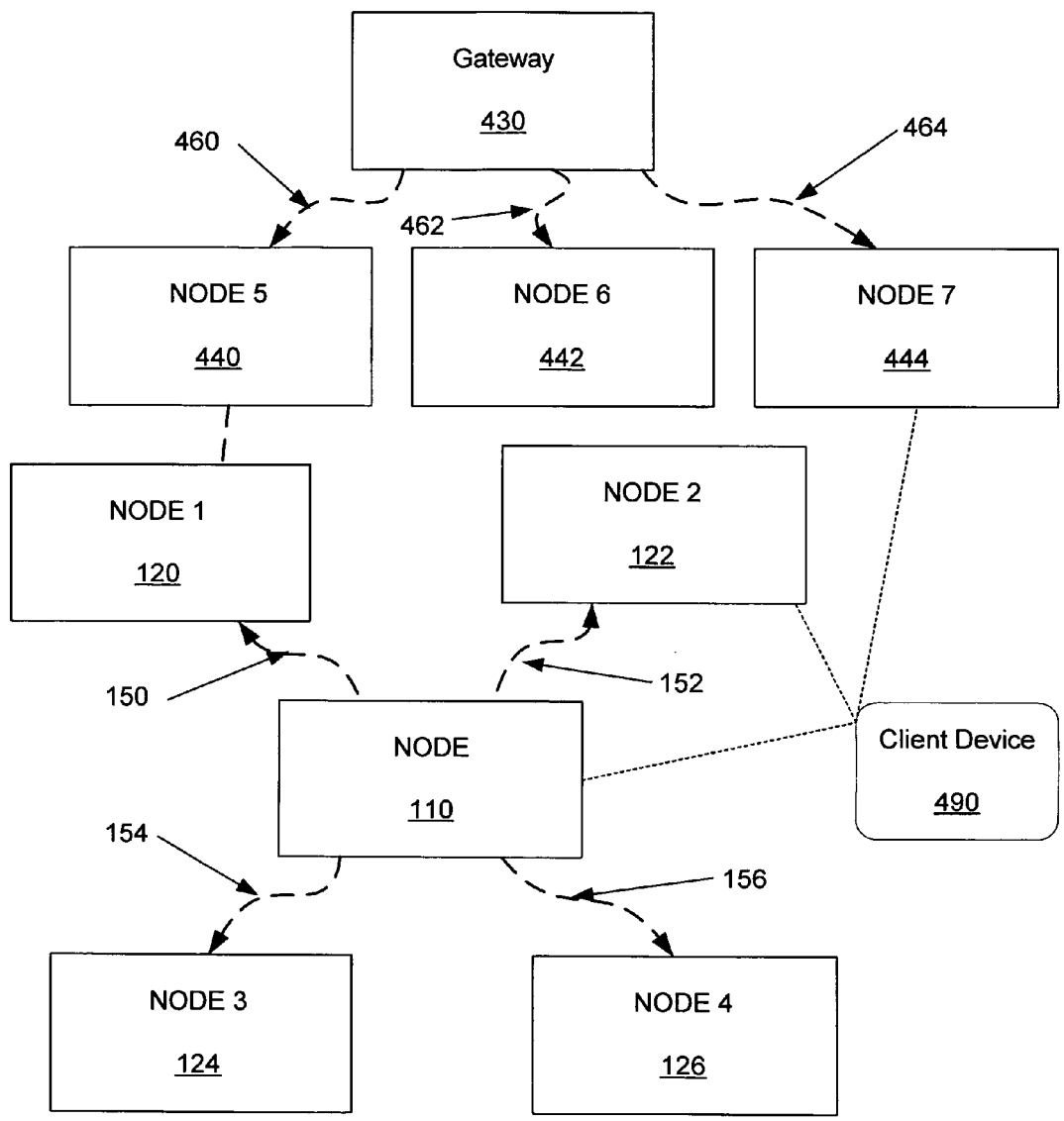
FIG. 4 shows a gateway and an access node, and associated reverse direction links, within a wireless mesh network.

FIG. 4 shows a gateway 430, an access node 110, and associated reverse direction links, within a wireless mesh network. The transmission power level of the gateway 430 can be set in a similar fashion as the access node 110. More specifically, based upon a quality of the reverse direction links of the gateway 430, the transmission power level of the gateway 430 can be adaptively set.

The gateway 430 includes reverse direction links 460, 462, 464. A determination of the quality of the reverse direction links 460, 462, 464 can be used to set the transmission power level of the gateway 430. Additionally, the transmission data rate of the gateway 430 can be set based on the quality of the reverse direction links 460, 462, 464.

Unlike the previously described access node 110, the gateway 430 does not have an upstream node. Therefore, only downstream links are used in the determination in the quality of the reverse direction links.

Similar to the access node 110, the quality of the links 460, 462, 464 can be determined by measuring the persistence of routing packets successfully received by the neighboring access nodes 440, 442, 444 from the gateway 430. It is to be understood that other methods can be used to determine link quality.

Routing Selections

Access nodes 120, 122, 124, 126, 440, 442, 444 are coupled either directly or indirectly to the gateway 430. That is, each access node is either directly connected to the upstream gateway 430, or indirectly connected through another access node to the upstream gateway 430. Many factors can be included in the decision of which access nodes or gateways each access node is connected. The network of FIG. 4 can include any number of additional gateways and access nodes. As shown in FIG. 4, a client 490 can obtain access to the network by establishing a connection to an available access node, such as, any of access nodes 110, 122, 144.

The gateway 430 broadcasts routing packets (beacons), which can be used to determine routing paths between access nodes 120, 122, 124, 126, 440, 442, 444 and the gateway 430 of the network. The beacons are received by all first-level access nodes (for example, access nodes 440, 442, 444), which are access nodes that are able to receive gateway transmitted beacons, and directly route data through to a gateway.

The beacons are used to establish a route from each access node to a gateway. The first level access nodes re-broadcast the beacon data, attaching their own information to the beacon. The information indicates to the second level access nodes that the path to the gateway includes the first level access node. The first level access nodes rebroadcast the beacons, after adding first level access node information. The information indicates to the second level access nodes that the path to the gateway includes the first level access node. The rebroadcast information can include the addresses of all upstream access nodes along the path to the gateway access node. That is, an embodiment includes each access node that receives routing beacons, modifying the routing beacons of a selected route by attaching an address of the access node, and re-broadcasting the modified beacons.

For one embodiment, the link quality of the beacon received determines whether that beacon is rebroadcast by the access node. If the quality of the beacon is above a determined threshold, it is rebroadcast. Another embodiment includes each access node only re-broadcasting beacons received from its currently-chosen default gateway. The beacons can be used to determine the quality of the link in both an upstream (towards a gateway) direction, and in a downstream (away from a gateway) direction. The upstream and the downstream link qualities can be used by each access node to select the best data routing path to a gateway. The link qualities can be influenced by other wireless transmission factors such as interference, noise and fading. Typically, the link qualities vary more for mobile access nodes than for fixed access nodes. The link qualities can be determined be calculating the percentage of beacons that are transmitted and successfully received. The link qualities can alternatively be determined by measuring a PER, BER or SNR of received routing beacons.

Asymmetrical characteristics of the links between access nodes and the gateways can lead to non-optimal routing selections if, for example, the quality of the upstream links is not included in routing decisions by access nodes gateways. Each gateway and access node transmits beacons. All access nodes and gateways that receive the beacons can make an estimate of the quality of the link based upon the reception of the beacons. The estimates can include both upstream link quality and downstream link quality. Once each access node has the upstream and downstream link qualities within every possible data path to a gateway, the access node can make a selection of the best available data path.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 4 also includes a second level access node 120, third level access node 110, and fourth level access nodes 122, 124, 126. The second level access nodes receive routing beacons from the first level access nodes, the third level access node receive routing beacons from the second level access nodes, and the fourth level access node receive routing beacons from the third level access nodes. Each access node continually monitors the quality of the upstream links to determine the best quality routing path to an upstream gateway.

Figure 5:
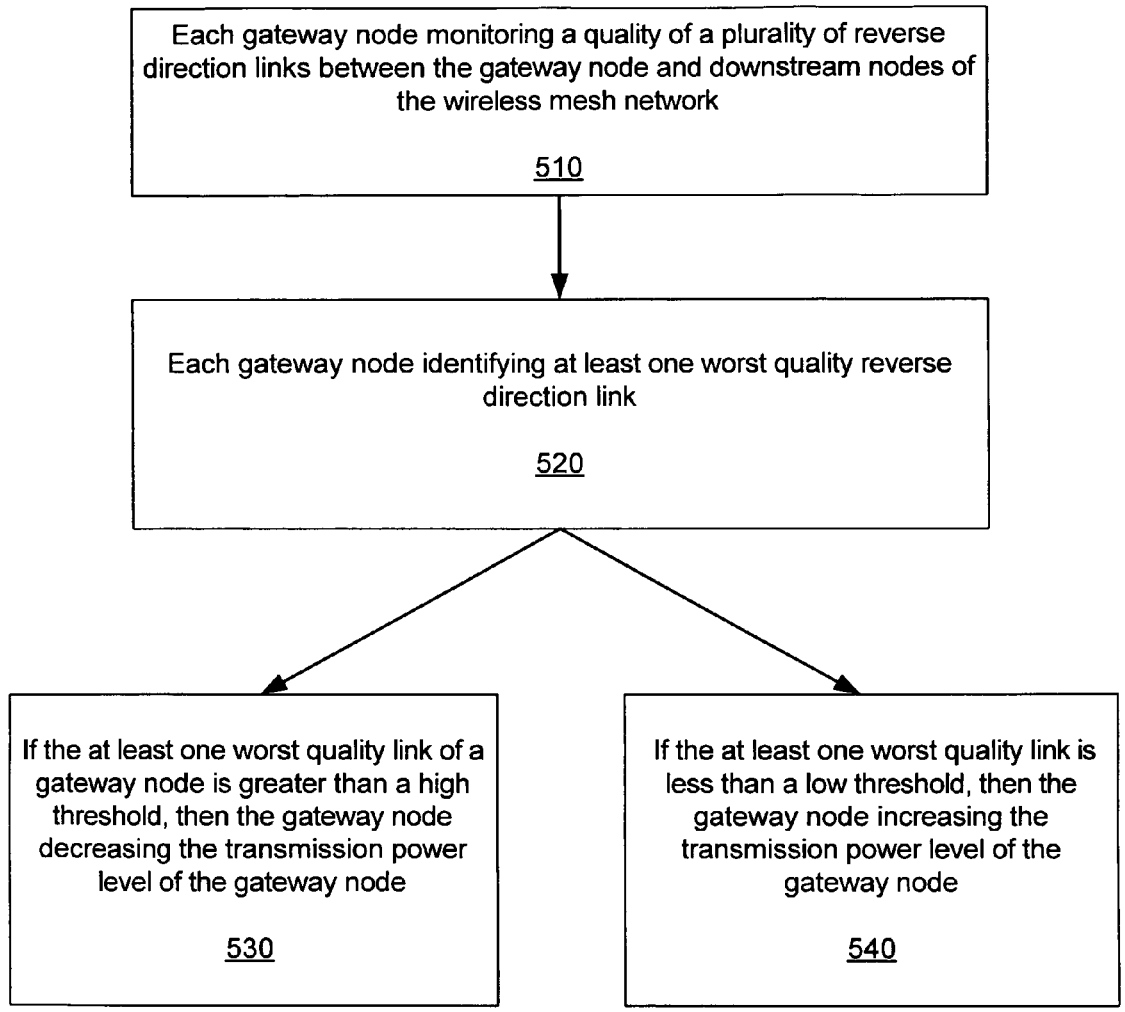
FIG. 5 is a flow chart that includes steps of one example of a method of setting a transmission power of a node within a wireless mesh network.

FIG. 5 is a flow chart that includes steps of one example of a method of setting a transmission power of a gateway node within a wireless mesh network. A first step 510 includes each gateway node monitoring a quality of a plurality of reverse direction links between the gateway node and downstream nodes of the wireless mesh network. A second step 520 includes each gateway node identifying at least one worst quality reverse direction link. If the at least one worst quality link of a gateway node is greater than a high threshold, then a third step 530 includes the gateway node decreasing the transmission power level of the gateway node. If the at least one worst quality link is less than a low threshold, then a fourth step 540 includes the gateway node increasing the transmission power level of the gateway node.

If the at least one worst quality link is greater than the high threshold, then the gateway node increases the transmission data rate. If the at least one worst quality link is less than the low threshold, then the gateway node decreases the transmission data rate.

One embodiment includes the monitoring of the quality of the reverse direction links being performed periodically. Other embodiments include the monitoring of the quality of the reverse direction links being performed if neighboring nodes communicate a level of interference above an interference threshold, or if downstream nodes indicate a lack of received signal strength.

As previously described, the quality of the reverse direction links can be determined by a persistence of routing packets transmitted by the gateway node that are successfully received by each of the neighboring (downstream) nodes. Each of the neighboring (downstream) nodes can transmit the persistence of the routing packets received by each neighboring node back to the gateway.

For an embodiment, the gateway sets the transmission power level to a maximum level and the transmission data rate to a minimum level when the gateway is performing frequency channel scanning. For another embodiment, the gateway sets the transmission power level to a maximum level and the transmission data rate to a minimum level when the gateway receives notice from a neighboring node (gateway or access node), that the neighboring node is performing frequency channel scanning.

Although specific embodiments of the invention have been described and illustrated, the invention is not to be limited to the specific forms or arrangements of parts so described and illustrated. The invention is limited only by the appended claims.

What is claimed:

1. A method of adaptively setting a transmission power level of a node within a wireless mesh network, the wireless mesh network comprising a gateway and a plurality of wireless access nodes, comprising:

monitoring a quality of a plurality of reverse direction links between the node and a plurality of downstream nodes, and between the node and an upstream node, of the wireless mesh network, wherein the reverse direction links are directed away from the node, wherein the quality of the plurality of reverse direction links is determined at each of the plurality of downstream nodes and the upstream node, and transmitted back to node, wherein the upstream node comprises the gateway or an upstream access node located in a routing path between the node and the gateway, and the node is located in a routing path between the downstream nodes and the gateway;

identifying a worst quality reverse direction link based on the monitoring of the quality of the plurality of reverse direction links;

if the worst quality link is greater than a high threshold, then decreasing the transmission power level of the node;

if the worst quality link is less than a low threshold, then increasing the transmission power level of the node.

2. The method of claim 1, further comprising:
if the worst quality link is greater than the high threshold, then increasing the transmission data rate of the node.

3. The method of claim 1, further comprising:
if the worst quality link is less than the low threshold, then decreasing the transmission data rate of the node.

4. The method of claim 1, wherein the monitoring of the quality of the reverse direction links is performed periodically.

5. The method of claim 1, wherein the monitoring of the quality of the reverse direction links is performed if neighboring nodes communicate a level of interference above an interference threshold.

6. The method of claim 1, wherein the monitoring of the quality of the reverse direction links is performed if downstream nodes indicate a lack of received signal strength.

7. The method of claim 1, wherein the quality of the reverse direction links is determined by a persistence of routing packets transmitted by the node that are successfully received by each of the neighboring nodes.

8. The method of claim 7, wherein each neighboring nodes transmits the persistence of the routing packets received by each neighboring node back to the node.

9. The method of claim 1, wherein the node is an access node of the wireless mesh network.

10. The method of claim 1, further comprising setting the transmission power level to a maximum level and the transmission data rate to a minimum level when the node is performing frequency channel scanning.

11. The method of claim 1, further comprising setting the transmission power level to a maximum level and the transmission data rate to a minimum level when the node receives notice from a neighboring node, that the neighboring node is performing frequency channel scanning.

12. A wireless mesh network comprising:
a plurality of gateways and a plurality of access nodes;
means for monitoring a quality of a plurality of reverse direction links between each access node and each of a plurality of downstream nodes of each access node, and between each access node and an upstream node of each access node, wherein the upstream node comprises a one of the plurality of gateways or an upstream access node located in a routing path between the node and the one of the plurality of gateways, and the node is located in a routing path between the downstream nodes and the gateway;
means for identifying a worst quality reverse direction link;
for each access node, if the worst quality link is greater than a high threshold, then decreasing the transmission power level of the access node;
for each access node, if the worst quality link is less than a low threshold, then increasing the transmission power level of the access node.

* * * * *